July 15, 1924.
H. W. MUHLEISEN
BRAKE SHOE
Filed Feb. 9, 1922
1,501,359
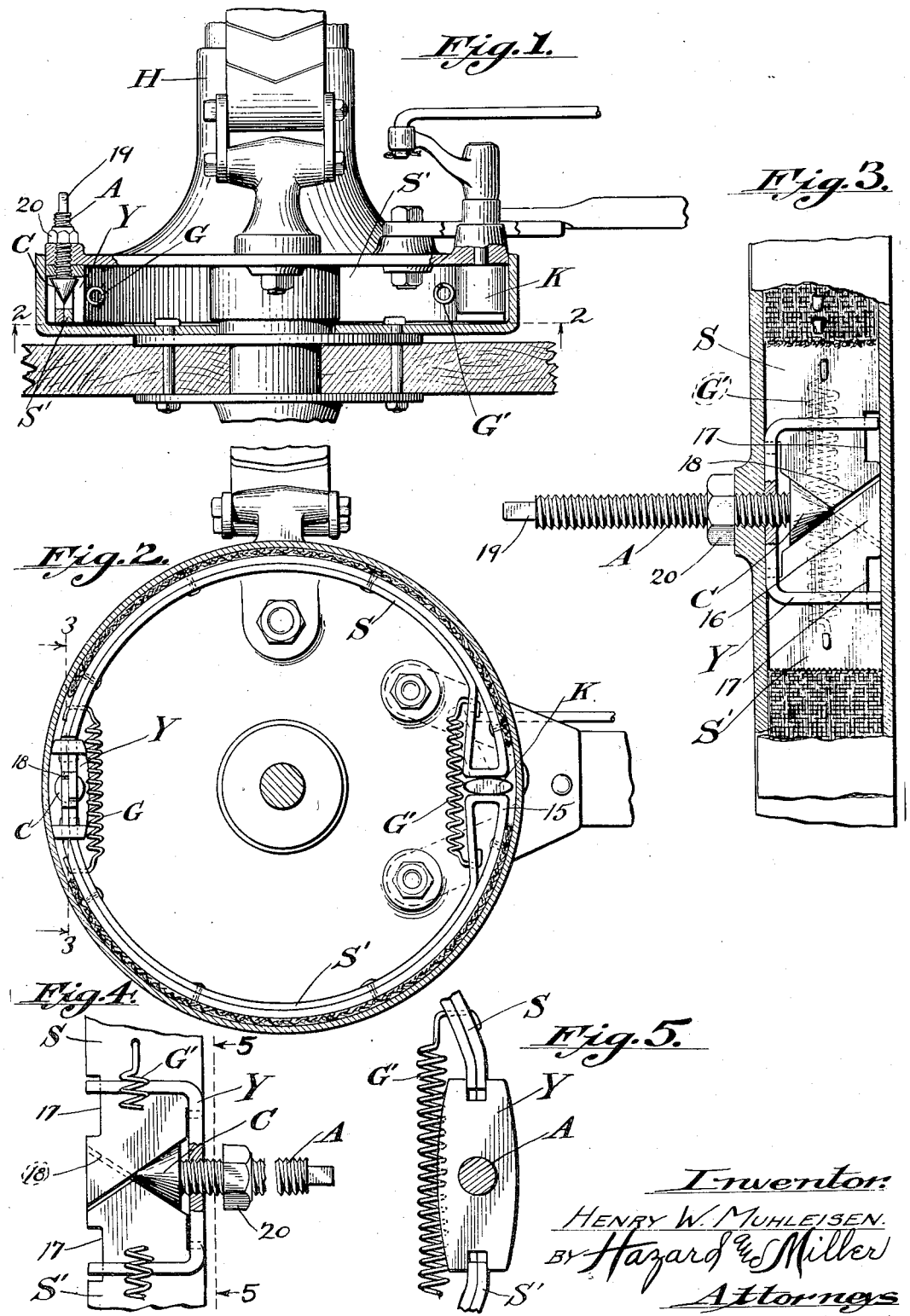

Patented July 15, 1924.

1,501,359

UNITED STATES PATENT OFFICE.

HENRY W. MUHLEISEN, OF LOS ANGELES, CALIFORNIA, ASSIGNOR, BY DIRECT AND MESNE ASSIGNMENTS, TO W. S. RUSH & CO., OF LOS ANGELES, CALIFORNIA, A PARTNERSHIP CONSISTING OF W. S. RUSH, E. S. RUSH, AND B. C. GRAVES.

BRAKE SHOE.

Application filed February 9, 1922. Serial No. 535,137.

*To all whom it may concern:*

Be it known that I, HENRY W. MUHLEISEN, a citizen of the United States, residing at Los Angeles, in the county of Los Angeles and State of California, have invented new and useful Improvements in Brake Shoes, of which the following is a specification.

My invention relates to vehicle brakes of that type including internal brake shoes capable of being expanded for engagement with a brake drum, and a purpose of my invention is the provision of a brake of this character having shoes of simple, inexpensive and durable construction, and expanding means therefor operable from a point exteriorly of the brake and inwardly of the drum, the construction of such means permitting of a greater degree of expansibility of the shoes within a given range of adjustment, providing holding means for the shoes in any expanded position, and allowing of the ready manipulation thereof without undue wear or friction.

Although I will describe only one form of vehicle brake embodying my invention and point out the novel features thereof in claims, it is to be understood that various changes and modifications may be made herein without departing from the spirit and scope of such claims.

Figure 1 is a view showing in horizontal section one form of vehicle brake embodying my invention in applied position upon a vehicle.

Fig. 2 is a vertical sectional view taken on the line 2—2 of Fig. 1.

Fig. 3 is an enlarged fragmentary sectional view taken substantially on the line 3—3 of Fig. 2.

Fig. 4 is a fragmentary view showing in side elevation the adjusting means for the brake shoes.

Fig. 5 is a sectional view taken on the line 5—5 of Fig. 4.

Similar reference characters refer to similar parts in each of the several views.

Referring specifically to the drawings my invention, in its present embodiment, comprises a brake drum D of conventional form adapted to be sustained upon the axle housing H as shown in Figs. 1 and 2, and containing brake shoes S and S' which are supported at one of their ends for outward swinging movement to engage the inner periphery of the drum while at their opposite end a cam K is interposed and mounted for rotational movement to force the shoes into engagement with the drum for securing the braking action.

Each shoe S or S' is made from a single strip of suitable metal bent upon itself at a point medially of its ends to provide a terminal portion 15 which is enlarged transversely to form a bearing surface for the cam K. As illustrated to advantage in Fig. 3, the opposite end of the brake shoe terminates in an extension 16 recessed at its inner edge as indicated at 17 and having a cut away portion 18 for accommodating the extension of the other brake shoe so that portions of the extensions are disposed in overlapped relation to each other. The free transverse edges of the extensions 16 are disposed diagonally of the periphery of the shoe and at intersecting angles with relation to each other to form converging walls or surfaces against which a cam C of conical form is adapted to bear.

For loosely retaining the adjustable ends of the brake shoes upon the housing H and at the same time to allow of the necessary pivotal movement of the shoes when the cam K is moved to expanding position, a yoke Y of U-shape form is sustained upon the housing with its parallel portions provided with suitable openings for loosely receiving the ends of the brake shoes. The recesses 17 are provided for the purpose of blocking the yoke to the brake shoe ends and at the same time causing the inner ends of the yoke to lie flush with the inner edge of the brake shoes so that the shoes of the yoke can be readily accommodated within the drum. It is to be understood that the openings of the parallel portions of the yoke are sufficiently long to allow of the ready association of the shoes with the yoke.

The yoke is secured to the axle housing

H by an adjusting screw A which extends through and threadedly engages the axle housing as well as the intermediate portion of the yoke Y. This screw A, as clearly shown in Fig. 3, carries at its inner end the conical cam C, while its outer end is provided with a rectangular head 19 to which a wrench or other suitable tool is adapted to be applied for effecting rotation of the screw in feeding the cam C inwardly or outwardly within the yoke. A nut 20 is mounted on the screw for adjustment with the housing in locking the screw in any adjusted position. Springs G and G' are associated with the ends of the shoes S and S' for normally urging the shoes to contracted position within the drum. The spring G spans the inner side of the yoke Y with its terminals connected to the adjacent end portions of the shoes S and S'. The spring G' is associated with the terminals 15 of the shoes S and S', all in the manner clearly shown in Fig. 2.

In the operation of the brake, the cam K is adapted to be rotated for forcing the brake shoes into engagement with the drum, and when the brake bands carried by the shoes become worn to the extent that the shoes fail to engage the brake drum with sufficient force to obtain the necessary braking action, the shoes can be adjusted at their pivoted end by an inward feeding of the cam C through a manipulation of the screw A. The arrangement of the cam C is such as to engage the diagonal or converging edges of the extensions 16 in the manner clearly shown in Fig. 3 so that as the cam is moved inwardly it bears against these converging edges thereby spreading the ends of the shoes against the tension of the spring G.

By virtue of the fact that the extensions 16 are arranged in overlapped relation with respect to each other, the cam C is capable of movement along the entire length of the converging edges so that a greater degree of adjustment of the shoes is rendered possible than with similar adjusting means heretofore proposed. And it is to be particularly noted that the entire length of the cam engages the converging edges at all times and irrespective of this position with respect to such edges, thereby providing the necessary bearing surface to effect the proper expansion of the brake shoes.

What I claim is:

1. In combination, a brake drum, brake shoes within the drum having pivoted ends reversely tapered and arranged in overlapped relation to each other, means associated with the overlapped ends for effecting expansion of said shoes, and means at the opposite ends of the shoes for forcing the same into engagement with the brake drum.

2. In a brake, a pair of shoes having extensions formed on one of their ends which are disposed in overlapped relation to each other and provided with converging edges.

3. In combination, a drum, brake shoes within the drum and having one of their ends movably sustained on the drum, extensions formed on said ends disposed in overlapped relation with each other and having converging edges, means engageable with and movable between said edges for expanding the shoes, and means at the opposite end of the shoes for forcing the same into engagement with the drum.

4. In combination, a drum, brake shoes having one of their ends movably sustained on said drum, said ends having converging edges recessed to permit of said edges being extended the full width of said ends, a conical cam screw-threadedly sustained on the frame and engageable with said edges for expanding the shoes, and means at the opposite end of the shoes for forcing the same into engagement with the drum.

5. A shoe for brakes comprising a single length of metal bent upon itself to provide at one end an enlarged bearing surface, and formed at its opposite end with an extension having a transverse edge disposed diagonally of the shoe, and recessed at one side for the purpose described.

6. In a brake, a pair of shoes having extensions formed on one of their ends which are disposed in overlapped relation to each other and provided with converging edges, a yoke adapted to slidably receive the extensions, said extensions being recessed to provide means by which the yoke can be locked to the extensions, and means carried by the yoke and engageable with the converging edges for effecting expansion of the shoes.

7. In combination, a brake drum, brake shoes within the drum, a yoke sustained on the frame and slidably receiving one of the ends of said shoes, extensions formed on said ends of said shoes having converging transverse edges disposed in overlapping relation to each other, a screw-threaded member extending through the yoke and threadedly engaging the same, a conical cam formed on the end of the member and engaging said converging edges whereby upon inward feeding of the member said cam will be caused to spread the extensions thereby effecting an expansion of said shoes, and means at the opposite end of the shoes for forcing the shoes into engagement with the drum.

8. A brake shoe having one end thereof formed with an extension, said shoe being of a reduced thickness at its free end to allow of the same being disposed in overlapped relation with respect to a similar extension of a similar shoe, the transverse edge of the extension being disposed diagonally of the shoe for the purpose described.

9. In a brake, a pair of shoes having extensions formed on one of their ends which are disposed in overlapped relation to each other and provided with converging edges, said ends being reduced in thickness so that the converging edges are disposed in the same plane.

In testimony whereof I have signed my name to this specification.

HENRY W. MUHLEISEN.